(12) United States Patent
Bamford et al.

(10) Patent No.: US 8,234,517 B2
(45) Date of Patent: Jul. 31, 2012

(54) PARALLEL RECOVERY BY NON-FAILED NODES

(75) Inventors: Roger J. Bamford, Peterborough, NH (US); Sashikanth Chandrasekaran, Chennai (IN); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2343 days.

(21) Appl. No.: 10/831,413

(22) Filed: Apr. 23, 2004

(65) Prior Publication Data

US 2004/0215640 A1    Oct. 28, 2004

Related U.S. Application Data

(63) Continuation-in-part of application No. 10/718,875, filed on Nov. 21, 2003, now Pat. No. 6,845,384, and a continuation-in-part of application No. 10/665,062, filed on Sep. 17, 2003, now Pat. No. 7,139,772.

(60) Provisional application No. 60/492,019, filed on Aug. 1, 2003.

(51) Int. Cl.
*G06F 11/00* (2006.01)
(52) U.S. Cl. ............... 714/4.1; 714/15; 714/33; 714/42
(58) Field of Classification Search ............... 714/3, 4.1, 714/15, 33, 42
See application file for complete search history.

(56) References Cited

U.S. PATENT DOCUMENTS

| | | | |
|---|---|---|---|
| 4,827,411 A | 5/1989 | Arrowood et al. | |
| 4,873,517 A | 10/1989 | Baratz et al. | |
| 4,914,571 A | 4/1990 | Baratz et al. | |
| 4,972,437 A | 11/1990 | Citron et al. | |
| 5,101,348 A | 3/1992 | Arrowood et al. | |
| 5,109,483 A | 4/1992 | Baratz et al. | |
| 5,313,051 A | 5/1994 | Brigida et al. | |
| 5,319,773 A | 6/1994 | Britton et al. | |
| 5,423,037 A * | 6/1995 | Hvasshovd | 707/202 |
| 5,432,926 A | 7/1995 | Citron et al. | |

(Continued)

FOREIGN PATENT DOCUMENTS

CA      2 435 388 A1    1/2003

(Continued)

OTHER PUBLICATIONS

International Searching Authority, "Written Opinion of the International Searching Authority," PCT/US2004/02555, mailing date Aug. 3, 2005, 11 pages.

(Continued)

*Primary Examiner* — Scott Baderman
*Assistant Examiner* — Loan L. T. Truong
(74) *Attorney, Agent, or Firm* — Hickman Palermo Truong Becker Bingham Wong LLP

(57) ABSTRACT

Various techniques are described for improving the performance of a shared-nothing database system in which at least two of the nodes that are running the shared-nothing database system have shared access to a disk. Specifically, techniques are provided for recovering the data owned by a failed node using multiple recovery nodes operating in parallel. The data owned by a failed node is reassigned to recovery nodes that have access to the shared disk on which the data resides. The recovery logs of the failed node are read by the recovery nodes, or by a coordinator process that distributes the recovery tasks to the recovery nodes.

30 Claims, 2 Drawing Sheets

U.S. PATENT DOCUMENTS

| | | | |
|---|---|---|---|
| 5,539,883 A | | 7/1996 | Allon et al. |
| 5,555,404 A | * | 9/1996 | Torbj.o slashed.msen et al. ............................ 707/202 |
| 5,613,060 A | | 3/1997 | Britton et al. |
| 5,675,791 A | | 10/1997 | Bhide et al. |
| 5,740,362 A | | 4/1998 | Buickel et al. |
| 5,805,785 A | | 9/1998 | Dias et al. |
| 5,832,484 A | * | 11/1998 | Sankaran et al. ................. 707/8 |
| 5,845,326 A | | 12/1998 | Hirayama et al. ............ 711/135 |
| 5,892,754 A | | 4/1999 | Kompella et al. |
| 5,907,849 A | * | 5/1999 | Dias et al. ..................... 707/202 |
| 5,951,695 A | * | 9/1999 | Kolovson ........................ 714/16 |
| 5,966,706 A | * | 10/1999 | Biliris et al. ........................... 1/1 |
| 5,996,086 A | | 11/1999 | Delaney et al. |
| 6,011,918 A | | 1/2000 | Cohen et al. |
| 6,088,758 A | | 7/2000 | Kaufman et al. ............. 711/100 |
| 6,119,244 A | * | 9/2000 | Schoenthal et al. .............. 714/4 |
| 6,253,229 B1 | | 6/2001 | Nielsen et al. |
| 6,253,273 B1 | | 6/2001 | Blumenau |
| 6,272,491 B1 | | 8/2001 | Chan et al. |
| 6,295,610 B1 | * | 9/2001 | Ganesh et al. .................. 714/19 |
| 6,311,265 B1 | | 10/2001 | Beckerle et al. |
| 6,321,238 B1 | | 11/2001 | Putzolu |
| 6,341,340 B1 | | 1/2002 | Tsukerman et al. |
| 6,370,619 B1 | | 4/2002 | Ho et al. |
| 6,438,714 B1 | | 8/2002 | Canestaro et al. |
| 6,453,404 B1 | | 9/2002 | Bereznyl et al. ............. 711/171 |
| 6,480,895 B1 | | 11/2002 | Gray et al. |
| 6,530,035 B1 | * | 3/2003 | Bridge ............................... 714/6 |
| 6,567,509 B1 | | 5/2003 | Gusler et al. |
| 6,567,811 B1 | | 5/2003 | Edwards et al. |
| 6,594,676 B1 | | 7/2003 | Moore |
| 6,611,899 B2 | | 8/2003 | Takahashi et al. ............ 711/119 |
| 6,622,263 B1 | * | 9/2003 | Stiffler et al. ................... 714/13 |
| 6,636,248 B1 | | 10/2003 | Christensen et al. |
| 6,658,589 B1 | * | 12/2003 | Taylor ............................... 714/6 |
| 6,711,571 B2 | * | 3/2004 | Putzolu ............................ 707/9 |
| 6,728,897 B1 | * | 4/2004 | Cramer et al. .................... 714/6 |
| 6,873,987 B1 | * | 3/2005 | Novaes et al. .................. 707/10 |
| 6,928,580 B2 | * | 8/2005 | Pedone et al. ................. 714/6.3 |
| 6,978,279 B1 | | 12/2005 | Lomet et al. .................. 707/202 |
| 6,981,104 B2 | | 12/2005 | Prabhu .......................... 711/144 |
| 7,039,828 B1 | * | 5/2006 | Scott ................................ 714/4 |
| 7,127,633 B1 | * | 10/2006 | Olson et al. ........................ 714/4 |
| 7,178,050 B2 | * | 2/2007 | Fung et al. ........................ 714/6 |
| 7,266,722 B2 | * | 9/2007 | Kingsbury ...................... 714/15 |
| 7,739,677 B1 | * | 6/2010 | Kekre et al. ................... 717/168 |
| RE42,664 E | * | 8/2011 | Hallmark et al. ............. 707/636 |
| 2001/0039550 A1 | * | 11/2001 | Putzolu ......................... 707/205 |
| 2002/0144047 A1 | * | 10/2002 | Loy et al. ......................... 711/1 |
| 2002/0188590 A1 | * | 12/2002 | Curran et al. ...................... 707/1 |
| 2003/0009707 A1 | * | 1/2003 | Pedone et al. .................... 714/5 |
| 2003/0041215 A1 | | 2/2003 | George et al. ................. 711/141 |
| 2003/0051187 A1 | | 3/2003 | Mashayekhi et al. |
| 2003/0154236 A1 | * | 8/2003 | Dar et al. ....................... 709/201 |
| 2003/0220974 A1 | * | 11/2003 | Curran et al. ................. 709/205 |
| 2003/0229650 A1 | * | 12/2003 | Olstad et al. .................. 707/200 |
| 2004/0098371 A1 | * | 5/2004 | Bayliss et al. ..................... 707/3 |
| 2004/0098390 A1 | * | 5/2004 | Bayliss et al. ..................... 707/7 |
| 2004/0172422 A1 | | 9/2004 | Putzolu |
| 2004/0172508 A1 | * | 9/2004 | Nguyen et al. ............... 711/162 |
| 2004/0205206 A1 | * | 10/2004 | Naik et al. .................... 709/230 |
| 2004/0215640 A1 | * | 10/2004 | Bamford et al. ............. 707/100 |
| 2006/0143350 A1 | | 6/2006 | Miloushev et al. |

FOREIGN PATENT DOCUMENTS

| | | |
|---|---|---|
| CA | 2435388 A1 | 1/2003 |
| EM | 0642092 A2 | 8/1994 |
| EP | 0483424 A1 | 10/1990 |
| EP | 0483424 A1 | 5/1992 |
| EP | 1521184 A2 | 6/2001 |
| WO | WO 97/04384 A1 | 2/1996 |
| WO | WO 96/37837 A2 | 11/1996 |
| WO | WO 97/04384 A | 2/1997 |
| WO | WO 99/44130 A | 9/1999 |
| WO | WO 02/073416 A | 9/2002 |
| WO | WO 03003252 A1 | 1/2003 |
| WO | WO 2005/013155 A1 | 2/2005 |

OTHER PUBLICATIONS

Current Claims, PCT/US2004/02555, 7 pages.

Abdallah, Maha et al., "One-Phase Commit: Does It Make Sense?" IEEE (1998), pp. 182-192.

Chandrasekaran, Sashikanth et al., "Shared Cache—The Future of Parallel Databases" IEEE (2003), pp. 840-850.

Lee, Inseon, et al., "A Single Phase Distributed Commit Protocol for Main Memory Database Systems" IEEE (2002), 8 pages.

Samaras, George et al., "Two-Phase Commit Optimization and Tradeoffs in the Commercial Environment" IEEE (1993), pp. 520-529.

International Search Report for PCT/US2004/024451, 11 pages.

International Preliminary Examining Authority, "Notification of Transmittal of the International Preliminary Report of Patentability," PCT/US2004/024425, dated Feb. 6, 2006, 6 pages.

Current Claims, PCT/US2004/024425, 4 pages.

International Searching Authority, "Notification of Transmittal of the International Search Report and the Written Opinion of the International Searching Authority, or the Declaration," PCT/US2004/024554, mailing date Aug. 3, 2005, 13 pages.

Current Claims, PCT/US2004/024554, 14 pages.

International Searching Authority, "Notification of Transmittal of the Intrnational Search Report and the Written Opinion of the International Searching Authority, or the Declaration," PCT/US004/024425, mailing date Aug. 4, 2005, 12 pages.

Current Claims, PCT/US2004/024425, 6 pages.

Feeley, Michael J. et al., "Integrating Coherency and Recoverability in Distributed Systems," (no date), www.usenix.org/publications, pp. 1-14.

BMC, "Mainview for Network Management-Tame Your Wild TCP/IP Network", Apr. 25, 2004, www.documents.bmc.com/products, pp. 1-6.

Goyal, P. et al., "Evaluation of Object Placement Techniques in a Policy-Managed Storage System," (no date), www.lass.cs.umass.edu/papers, pp. 1-21.

State Intellectual Property Office of P.R.C., "Notification of the First Office Action (PCT Application Entering National Phase)", Foreign application No. 200480021907.0, received Jan. 11, 2008, 14 pages.

Samaras, George, et al., "Two-Phase Commit Optimizations and tradeoffs in the Commercial Environment", IBM Distributed Systems Architecture, IBM Almaden Research Center, Proceedings of the International Conference on Data Engineering, Vienna, Conf. 9, Apr. 1993, 21 pages.

Abdallah, Maha, et al., "One-Phase Commit: Does It Make Sense?", Parallel and Distributed Systems, Proceedings International Conference on Tainan, Dec. 1998, 11 pages.

Claims, PCT/US04/24555, 4 pages.

Government of India Patent Office, "First Examination Report", PCT/US04/24555, received Nov. 7, 2007, 6 pages.

Claims (Clean Copy), International application No. PCT/US04/24554, 15 pages.

State Intellectual Property Office of P.R.C. "Notification of the First Office Action", International application No. 200480021585.x, dated Jul. 6, 2007, 11 pages.

Government of India Patent Office, "First Examination Report", Patent application No. 418/CHENP/2006, received Apr. 22, 2008, 3 pages.

Claims, Patent application No. PCT/US04/24554, 6 pages.

Application No. 2,532,054, Canadian Intellectual Property Office, Office Action dated Aug. 19, 2010, 2 pages.

Current claims, Canadian Application No. 2,532,054, 13 pages.

* cited by examiner

PARALLEL RECOVERY BY NON-FAILED NODES

This application claims the benefit of priority from U.S. Provisional Application Ser. No. 60/492,019 entitled "Shared Nothing on Shared Disk Hardware", filed Aug. 1, 2003, which is incorporated by reference in its entirety for all purposes as if fully set forth herein.

This application also claims benefit as a Continuation-in-part of application Ser. No. 10/665,062 filed Sep. 17, 2003 now U.S. Pat. No. 7,139,772 and application Ser. No. 10/718,875, filed Nov. 21, 2003 now U.S. Pat. No. 6,845,384, the entire contents of which are hereby incorporated by reference as if fully set forth herein.

This application is related to U.S. application Ser. No. 10/831,401 entitled "Dynamic Reassignment of Data Ownership," by Roger Bamford, Sashikanth Chandrasekaran and Angelo Pruscino, filed on Apr. 23, 2004 and issued as U.S. Pat. No. 7,277,897 on Oct. 2, 2007, and U.S. application Ser. No. 10/831,248 entitled "Maintaining A Shared Cache That Has Partitions Allocated Among Multiple Nodes And A Data-To-Partition Mapping," by Roger Bamford, Sashikanth Chandrasekaran and Angelo Pruscino, filed on Apr. 23, 2004, and issued as U.S. Pat. No. 7,120,651 on Oct. 10, 2006; both of which are incorporated by reference in their entirety for all purposes as if fully set forth herein.

FIELD OF THE INVENTION

The present invention relates to techniques for managing data in a shared-nothing database system running on shared disk hardware.

BACKGROUND OF THE INVENTION

Multi-processing computer systems typically fall into three categories: shared everything systems, shared disk systems, and shared-nothing systems. In shared everything systems, processes on all processors have direct access to all volatile memory devices (hereinafter generally referred to as "memory") and to all non-volatile memory devices (hereinafter generally referred to as "disks") in the system. Consequently, a high degree of wiring between the various computer components is required to provide shared everything functionality. In addition, there are scalability limits to shared everything architectures.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. Shared disk systems generally require less wiring than shared everything systems. Shared disk systems also adapt easily to unbalanced workload conditions because all nodes can access all data. However, shared disk systems are susceptible to coherence overhead. For example, if a first node has modified data and a second node wants to read or modify the same data, then various steps may have to be taken to ensure that the correct version of the data is provided to the second node.

In shared-nothing systems, all processors, memories and disks are grouped into nodes. In shared-nothing systems as in shared disk systems, each node may itself constitute a shared everything system or a shared disk system. Only the processes running on a particular node can directly access the memories and disks within the particular node. Of the three general types of multi-processing systems, shared-nothing systems typically require the least amount of wiring between the various system components. However, shared-nothing systems are the most susceptible to unbalanced workload conditions. For example, all of the data to be accessed during a particular task may reside on the disks of a particular node. Consequently, only processes running within that node can be used to perform the work granule, even though processes on other nodes remain idle.

Databases that run on multi-node systems typically fall into two categories: shared disk databases and shared-nothing databases.

Shared Disk Databases

A shared disk database coordinates work based on the assumption that all data managed by the database system is visible to all processing nodes that are available to the database system. Consequently, in a shared disk database, the server may assign any work to a process on any node, regardless of the location of the disk that contains the data that will be accessed during the work.

Because all nodes have access to the same data, and each node has its own private cache, numerous versions of the same data item may reside in the caches of any number of the many nodes. Unfortunately, this means that when one node requires a particular version of a particular data item, the node must coordinate with the other nodes to have the particular version of the data item shipped to the requesting node. Thus, shared disk databases are said to operate on the concept of "data shipping," where data must be shipped to the node that has been assigned to work on the data.

Such data shipping requests may result in "pings". Specifically, a ping occurs when a copy of a data item that is needed by one node resides in the cache of another node. A ping may require the data item to be written to disk, and then read from disk. Performance of the disk operations necessitated by pings can significantly reduce the performance of the database system.

Shared disk databases may be run on both shared-nothing and shared disk computer systems. To run a shared disk database on a shared-nothing computer system, software support may be added to the operating system or additional hardware may be provided to allow processes to have access to remote disks.

Shared-Nothing Databases

A shared-nothing database assumes that a process can only access data if the data is contained on a disk that belongs to the same node as the process. Consequently, if a particular node wants an operation to be performed on a data item that is owned by another node, the particular node must send a request to the other node for the other node to perform the operation. Thus, instead of shipping the data between nodes, shared-nothing databases are said to perform "function shipping".

Because any given piece of data is owned by only one node, only the one node (the "owner" of the data) will ever have a copy of the data in its cache. Consequently, there is no need for the type of cache coherency mechanism that is required in shared disk database systems. Further, shared-nothing systems do not suffer the performance penalties associated with pings, since a node that owns a data item will not be asked to save a cached version of the data item to disk so that another node could then load the data item into its cache.

Shared-nothing databases may be run on both shared disk and shared-nothing multi-processing systems. To run a shared-nothing database on a shared disk machine, a mechanism may be provided for partitioning the database, and assigning ownership of each partition to a particular node.

The fact that only the owning node may operate on a piece of data means that the workload in a shared-nothing database may become severely unbalanced. For example, in a system of ten nodes, 90% of all work requests may involve data that is owned by one of the nodes. Consequently, the one node is overworked and the computational resources of the other nodes are underutilized. To "rebalance" the workload, a shared-nothing database may be taken offline, and the data (and ownership thereof) may be redistributed among the nodes. However, this process involves moving potentially huge amounts of data, and may only temporarily solve the workload skew.

Failures in a Database System

A database server failure can occur when a problem arises that prevents a database server from continuing work. Database server failures may result from hardware problems such as a power outage, or software problems such as an operating system or database system crash. Database server failures can also occur expectedly, for example, when a SHUTDOWN ABORT or a STARTUP FORCE statement is issued to an Oracle database server.

Due to the way in which database updates are performed to data files in some database systems, at any given point in time, a data file may contain some data blocks that (1) have been tentatively modified by uncommitted transactions and/or (2) do not yet reflect updates performed by committed transactions. Thus, a database recovery operation must be performed after a database server failure to restore the database to the transaction consistent state it possessed just prior to the database server failure. In a transaction consistent state, a database reflects all the changes made by transactions which are committed and none of the changes made by transactions which are not committed.

A typical database system performs several steps during a database server recovery. First, the database system "rolls forward", or reapplies to the data files all of the changes recorded in the redo log. Rolling forward proceeds through as many redo log files as necessary to bring the database forward in time to reflect all of the changes made prior to the time of the crash. Rolling forward usually includes applying the changes in online redo log files, and may also include applying changes recorded in archived redo log files (online redo files which are archived before being reused). After rolling forward, the data blocks contain all committed changes, as well as any uncommitted changes that were recorded in the redo log prior to the crash.

Rollback segments include records for undoing uncommitted changes that remain after the roll-forward operation. In database recovery, the information contained in the rollback segments is used to undo the changes made by transactions that were uncommitted at the time of the crash. The process of undoing changes made by the uncommitted transactions is referred to as "rolling back" the transactions.

The techniques described herein are not limited to environments in which rollback segments are used for undoing transactions. For example, in some database environments, the undo and redo are written in a single sequential log. In such environments, recovery may be performed based on the contents of the single log, rather than distinct redo and undo logs.

Failure in a Shared-Nothing Database System

In any multiple-node computer system, it is possible for one or more nodes to fail while one or more other nodes remain functional. In a shared-nothing database system, failure of a node typically makes the data items owned by the failed node unavailable. Before those data items can be accessed again, a recovery operation must be performed on those data items. The faster the recovery operation is performed, the more quickly the data items will become available.

In a shared nothing database system, recovery operations may be performed using either no partitioning or pre-failure partitioning. When no partitioning is used, a single non-failed node assumes ownership of all data items previously owned by the failed node. The non-failed node then proceeds to perform the entire recovery operation itself. Because the no partitioning approach only makes use of the processing power of one active node, the recovery takes much longer than it would if the recovery operation was shared across many active nodes. This is how recovery is typically done in shared nothing databases as the recovering node needs to have access to the data of the failed node. For simplicity of the hardware configuration, a "buddy" system is typically used, where the nodes are divided into pairs of nodes, each with access to each other's data, and each responsible for recovering each other in the event of a failure.

According to the pre-failure partitioning approach, the data owned by the failed node is partitioned into distinct shared-nothing database fragments prior to the failure. After failure, each of the distinct fragments is assigned to a different non-failed node for recovery. Because the recovery operation is spread among many nodes, the recovery can be completed faster than if performed by only one node. However, it is rarely known exactly when a node will fail. Thus, for a node to be recovered using pre-failure partitioning approach, the partitioning, which typically involves dividing the main memory and CPUs of the node among the database fragments, is typically performed long before any failure actually occurs. Unfortunately, while the node is thus partitioned, the steady-state runtime performance of the node is reduced. Various factors lead to such a performance reduction. For example, each physical node's resources may be underutilized. Although multiple partitions are owned by the same physical node, the partitions cannot share memory for the buffer pool, package cache etc. This causes underutilization because it is possible to make better use of a single piece of memory rather than fragmented pieces of memory. In addition, the interprocess communication for a given workload increases with the number of partitions. For example, an application that scales to four partitions may not scale to twelve partitions. However, using the pre-failure partition approach for parallel recovery after failure, 12 partitions may be required.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Various techniques are described hereafter for improving the performance of a shared-nothing database system that includes a shared disk storage system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are described hereafter for improving the performance of a shared-nothing database system in which at least two of the nodes that are running the shared-nothing database system have shared access to a disk. As dictated by the shared-nothing architecture of the database system, each piece of data is still owned by only one node at any given time. However, the fact that at least some of the nodes that are running the shared-nothing database system have shared access to a disk is exploited to more efficiently rebalance and recover the shared-nothing database system.

Specifically, techniques are provided for recovering the data owned by a failed node using multiple recovery nodes operating in parallel. The data owned by a failed node is reassigned to recovery nodes that have access to the shared disk on which the data resides. The recovery logs of the failed node are read by the recovery nodes, or by a coordinator process that distributes the recovery tasks to the recovery nodes.

Exemplary Cluster that Includes Shared Disk Systems

Figure 1:
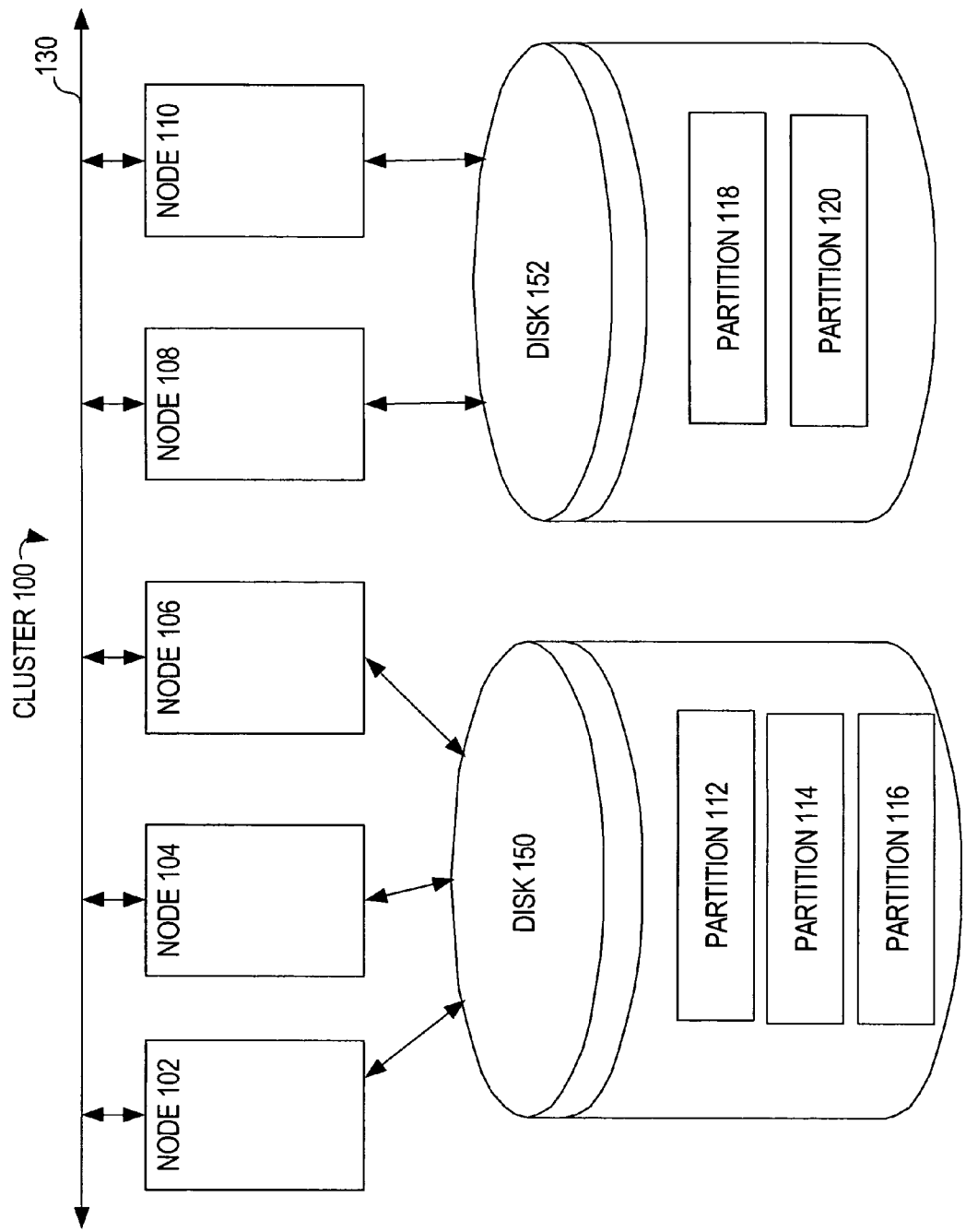
FIG. 1 is a block diagram illustrating a cluster that includes two shared disk subsystems, according to an embodiment of the invention.

FIG. 1 is a block diagram illustrating a cluster 100 upon which embodiments of the invention may be implemented. Cluster 100 includes five nodes 102, 104, 106, 108 and 110 that are coupled by an interconnect 130 that allows the nodes to communicate with each other. Cluster 100 includes two disks 150 and 152. Nodes 102, 104 and 106 have access to disk 150, and nodes 108 and 110 have access to disk 152. Thus, the subsystem that includes nodes 102, 104 and 106 and disk 150 constitutes a first shared disk system, while the subsystem that includes nodes 108 and 110 and disk 152 constitutes a second shared disk system.

Cluster 100 is an example of a relatively simple system that includes two shared disk subsystems with no overlapping membership between the shared disk subsystems. Actual systems may be much more complex than cluster 100, with hundreds of nodes, hundreds of shared disks, and many-to-many relationships between the nodes and shared disks. In such a system, a single node that has access to many disks may, for example, be a member of several distinct shared disk subsystems, where each shared disk subsystem includes one of the shared disks and all nodes that have access to the shared disk.

Shared-Nothing Database on Shared Disk System

For the purpose of illustration, it shall be assumed that a shared-nothing database system is running on cluster 100, where the database managed by the shared-nothing database system is stored on disks 150 and 152. Based on the shared-nothing nature of the database system, the data may be segregated into five groups or partitions 112, 114, 116, 118 and 120. Each of the partitions is assigned to a corresponding node. The node assigned to a partition is considered to be the exclusive owner of all data that resides in that partition. In the present example, nodes 102, 104, 106, 108 and 110 respectively own partitions 112, 114, 116, 118 and 120. The partitions 112, 114 and 118 owned by the nodes that have access to disk 150 (nodes 102, 104 and 106) are stored on disk 150.

Similarly, the partitions 118 and 120 owned by the nodes that have access to disk 152 (nodes 108 and 110) are stored on disk 152.

As dictated by the shared-nothing nature of the database system running on cluster 100, any piece of data is owned by at most one node at any given time. In addition, access to the shared data is coordinated by function shipping. For example, in the context of a database system that supports the SQL language, a node that does not own a particular piece of data may cause an operation to be performed on that data by forwarding fragments of SQL statements to the node that does own the piece of data.

Ownership Map

To efficiently perform function shipping, all nodes need to know which nodes own which data. Accordingly, an ownership map is established, where the ownership map indicates the data-to-node ownership assignments. During runtime, the various nodes consult the ownership map to route SQL fragments to the correct nodes at run-time.

According to one embodiment, the data-to-node mapping need not be determined at compilation time of an SQL (or any other database access language) statement. Rather, as shall be described in greater detail hereafter, the data-to-node mapping may be established and revised during runtime. Using the techniques described hereafter, when the ownership changes from one node that has access to the disk on which the data resides to another node that has access to the disk on which the data resides, the ownership change is performed without moving the data from its persistent location on the disk.

Locking

Locks are structures used to coordinate access to a resource among several entities that have access to the resource. In the case of a shared-nothing database system, there is no need for global locking to coordinate accesses to the user data in the shared-nothing database, since any given piece of data is only owned by a single node. However, since all of the nodes of the shared-nothing database require access to the ownership map, some locking may be required to prevent inconsistent updates to the ownership map.

According to one embodiment, a two-node locking scheme is used when ownership of a piece of data is being reassigned from one node (the "old owner") to another node (the "new owner"). Further, a global locking mechanism may be used to control access to the metadata associated with the shared-nothing database. Such metadata may include, for example, the ownership map.

If ownership of the data is being redistributed for the purpose of parallel recovery, a locking scheme for the ownership map is not required. Specifically, if the ownership does not change during run-time, a simple scheme can be used to parallelize the recovery among survivors. For example, if there are N survivors, the first survivor can be responsible for recovering all data owned by the dead node which falls into the first 1/N buckets and so on. After the recovery is complete the ownership of all data owned by the dead node reverts back to a single node.

Bucket-Based Partitioning

As mentioned above, the data that is managed by the shared-nothing database is partitioned, and the data in each partition is exclusively owned by one node. According to one embodiment, the partitions are established by assigning the data to logical buckets, and then assigning each of the buckets to a partition. Thus, the data-to-node mapping in the ownership map includes a data-to-bucket mapping, and a bucket-to-node mapping.

According to one embodiment, the data-to-bucket mapping is established by applying a hash function to the name of each data item. Similarly, the bucket-to-node mapping may be established by applying another hash function to identifiers associated with the buckets. Alternatively, one or both of the mappings may be established using range-based partitioning, list partitioning, or by simply enumerating each individual relationship. For example, one million data items may be mapped to fifty buckets by splitting the namespace of the data items into fifty ranges. The fifty buckets may then be mapped to five nodes by storing a record for each bucket that (1) identifies the bucket and (2) identifies the node currently assigned the bucket.

The use of buckets significantly reduces the size of the ownership mapping relative to a mapping in which a separate mapping record was stored for each data item. Further, in embodiments where there number of buckets exceeds the number of nodes, the use of buckets makes it relatively easy to reassign ownership to a subset of the data owned by a given node. For example, a new node may be assigned a single bucket from a node that is currently assigned ten buckets. Such a reassignment would simply involve revising the record that indicates the bucket-to-node mapping for that bucket. The data-to-bucket mapping of the reassigned data would not have to be changed.

As mentioned above, the data-to-bucket mapping may be established using any one of a variety of techniques, including but not limited to hash partitioning, range partitioning or list values. If range based partitioning is used and the number of ranges is not significantly greater than the number of nodes, then the database server may employ finer grained (narrower) ranges to achieve the desired number of buckets so long as the range key used to partition the data items is a value that will not change (e.g. date). If the range key is a value that could change, then in response to a change to the range key value for a particular data item, the data item is removed from its old bucket and added to the bucket that corresponds to the new value of the data item's range key.

Establishing the Initial Assignment of Ownership

Using the mapping techniques described above, ownership of a single table or index can be shared among multiple nodes. Initially, the assignment of ownership may be random. For example, a user may select the key and partitioning technique (e.g. hash, range, list, etc) for the data-to-bucket mapping, and the partitioning technique for the bucket-to-node mapping, but need not specify the initial assignment of buckets to nodes. The database server may then determine the key for the bucket-to-node mapping based on the key for the data-to-bucket mapping, and create the initial bucket-to-node assignments without regard to the specific data and database objects represented by the buckets.

For example, if the user chooses to partition the object based on key A, the database server will use key A to determine the bucket-to-node mapping. In some cases, the database server can append extra keys or apply a different function (as long as it preserves the data-to-bucket mapping) to the key(s) used for the data-to-bucket mapping. For example, if the object is hash partitioned using key A into four data buckets, the database server could subdivide each of those four buckets into three buckets each (to allow for flexible assignment of buckets to node) by either applying a hash function on key B to determine the bucket-to-node mapping, or by simply increasing the number of hash values to 12. If the hash is a modulo function the 0th, 4th and 8th bucket-to-node buckets will correspond to the 0th data-to-bucket bucket, the 1st, 5th and 9th bucket-to-node buckets will correspond to the 1st data-to-bucket bucket etc.

As another example, if the object is range partitioned on a key A which is of type DATE, then the data-to-bucket mapping could be specified by using the function year(date) which returns the year. But the bucket-to-node mapping could be internally computed by the database server by using the month_and_year(date). Each year partition is divided into 12 bucket-to-node buckets. This, way, if the database server determines that a particular year's data is accessed frequently (which will typically be the current year) it can redistribute those 12 buckets among the other nodes.

In both examples given above, given a bucket-to-node bucket#, the database server can uniquely determine the data-to-bucket bucket#. Also in those examples, the user selects the key and partitioning technique for the data-to-bucket mapping. However, in alternative embodiments, the user may not select the key and partitioning technique for the data-to-bucket mapping. Rather, the key and partitioning technique for the data-to-bucket mapping may also be determined automatically by the database server.

According to one embodiment, the database server makes the initial bucket-to-node assignments based on how many buckets should be assigned to each node. For example, nodes with greater capacity may be assigned more buckets. However, in the initial assignments, the decision of which particular buckets should be assigned to which nodes is random.

In an alternative embodiment, the database server does take into account which data is represented by a bucket when making the bucket-to-node assignments. For example, assume that data for a particular table is divided among several buckets. The database server may intentionally assign all of those buckets to the same node, or intentionally distribute ownership of those buckets among many nodes. Similarly, the database server may, in the initial assignment, attempt to assign buckets associated with tables to the same nodes as buckets associated with indexes for those tables. Conversely, the database server may attempt to assign buckets associated with tables to different nodes than the nodes to which buckets associated with indexes for those tables are assigned.

Parallel Recovery of Shared Data Owned by One or More Nodes Across Surviving Nodes It is possible for one or more nodes of a distributed shared nothing database system to fail. To ensure the availability of the data that is managed by the shared-nothing database system, the buckets owned by the nodes that have failed (the "dead nodes") must be reassigned to nodes that have not failed. Typically, the bucket-to-node mapping information will be stored in a database catalog that is located on a shared disk. By inspecting the database catalog, the non-failed nodes of the shared-nothing database system can determine the list of partition buckets that were owned by the dead nodes.

Once the partition buckets owned by dead nodes have been identified, the partition buckets are redistributed among surviving nodes. Significantly, this redistribution can take place without moving the underlying data, as long as the surviving node that is assigned the ownership of a bucket has access to the shared disk that contains the data that maps to the bucket. For example, assume that node 102 of cluster 100 fails. If node 102 owned the bucket that corresponds to partition 112, then that bucket can be reassigned to either node 104 or node 106 without changing the physical location of the data on disk 150.

After the reassignment of ownership of the buckets that were previously owned by the dead nodes, roll-forward and roll-back operations are performed on the items in those buckets by the surviving nodes. According to one embodiment, the surviving nodes to which the failed nodes' buckets are assigned include only those surviving nodes that have access to the failed node's redo logs, and the data owned by the failed node. Alternatively, if the surviving node that performs recovery has access to the failed node's data, but not to the failed node's redo logs, then a coordinator may scan the redo log and distribute the redo records contained therein based on the bucket for which the redo was generated.

According to one embodiment, the nodes that are doing recovery write the blocks that are being recovered to disk in a particular order to avoid problems. Specifically, if a large amount of recovery needs to be performed (for example, during media recovery) the recovering nodes take checkpoints or write the recovered blocks to the disk. However, when writing the blocks to disk under these circumstances, the recovery nodes may not be able to perform the writes in any order. For example, if the redo generated for block A is ahead of the redo generated for block B and blocks A and B are being recovered by two separate nodes, block B cannot be written ahead of block A, especially if this means that the checkpoint for the failed node's thread of redo may be advanced past the redo for block B. To avoid this problem, the recovering nodes may exchange the earliest dirty recovery block (block for which redo was applied from the failed node) with each other. A node can write its block if its block is the earliest dirty recovery block. This way the blocks will be written in order.

Since several nodes participate in the recovery operation, the recovery operation is performed faster than the no partitioning approach previously described. Further, unlike the pre-failure partitioning approach described above, the redistribution of ownership of the buckets takes place after the failure, so that no run-time penalty is incurred.

The techniques described herein for distributing recovery operations to multiple nodes for parallel recovery operations apply equally to parallel media recovery of an object owned by a single node. Specifically, when the media containing an object fails, ownership of portions of the object can be distributed to several nodes for the duration of the recovery. After recovery has been completed, ownership can be collapsed back to a single node.

According to one embodiment to handle nested failures, the database system keeps track of whether or not a piece of undo has been applied to a block. Tracking the application of undo is helpful because earlier parts of a transaction which modified different partitions may have been rolled back, whereas later changes may not have been.

According to one embodiment, partition bucket numbers are stored in the redo records. For example, if a redo record indicates a change made to a block that belongs to a particular bucket, then the bucket number of that bucket is stored within the redo record. Consequently, when applying redo records, a recovery process can automatically skip those redo records that indicate partition bucket numbers of buckets that do not require recovery.

When applying redo, all recovering nodes can scan the redo logs of the failed nodes, or a single recovery coordinator can scan the logs and distribute pieces of redo to the nodes participating in the recovery. In an embodiment where a recovery coordinator distributes pieces of redo, the redo is distributed based on the partition bucket number. Thus, the recovery node assigned to recover a particular bucket will receive from the recovery coordinator the redo for all data items that belong to that bucket.

It is possible that, during the recovery operation, a particular piece of data will move from one partition to another. According to one embodiment, an operation that moves an object from one partition to another is treated as a delete followed by an insert. Hence there are no ordering dependencies between pieces of redo that belong to different buckets.

Selective Parallelization

According to one embodiment, only selected portions of the recovery operation are parallelized. For example, a particular node can be assigned as the recovery coordinator. During the recovery, the recovery coordinator serially recovers all of the data that requires recovery until the recovery coordinator encounters a recovery task that satisfies parallelization criteria. For example, the parallelization criteria may specify that parallel recovery should be used for objects that exceed a particular size threshold. Consequently, when the recovery coordinator encounters such an object during the recovery process, the database server redistributes ownership of the buckets that correspond to the large object so that several nodes can assist in the parallel recovery of that object. Upon completion of the specified task, the ownership of the data may be reassigned back to the recovery coordinator.

In-Transit Buckets

While the ownership of a bucket is being transferred from one node (the "old owner") to another (the "new owner"), the bucket is considered to be "in-transit". If the old owner and/or the new owner fails while the bucket is in-transit, additional recovery steps may be necessary. The additional recovery steps that are required are dictated by the ownership transfer technique that is used by the database system. If the ownership transfer technique allows both the old owner and the new owner to have dirty versions of data items that belong to an in-transit bucket, then recovery may involve (1) using the cached dirty versions of data items that reside in the surviving node, and (2) merging and applying the redo logs of the old owner and the new owner. Similarly, if a partition bucket was in-transit at the time of failure, undo logs generated by multiple nodes may need to be applied to rollback the data items that belong to the bucket.

Determining Which Buckets Need Recovery

When a node fails, the bucket-to-node mapping can be inspected to determine which buckets belonged to the failed node, and therefore require recovery. According to one embodiment, a first pass is made through the bucket-to-node mapping to determine which buckets require recovery. After the first pass, all buckets that do not require recovery are made immediately available for access. A second pass is then made, during which recovery operations are performed on the buckets that require recovery. The recovery performed during the second pass may be accomplished by a single node that is designated as the owner of all of the data owned by the dead node, or may be distributed among the surviving nodes using the ownership map.

Hardware Overview

Figure 2:
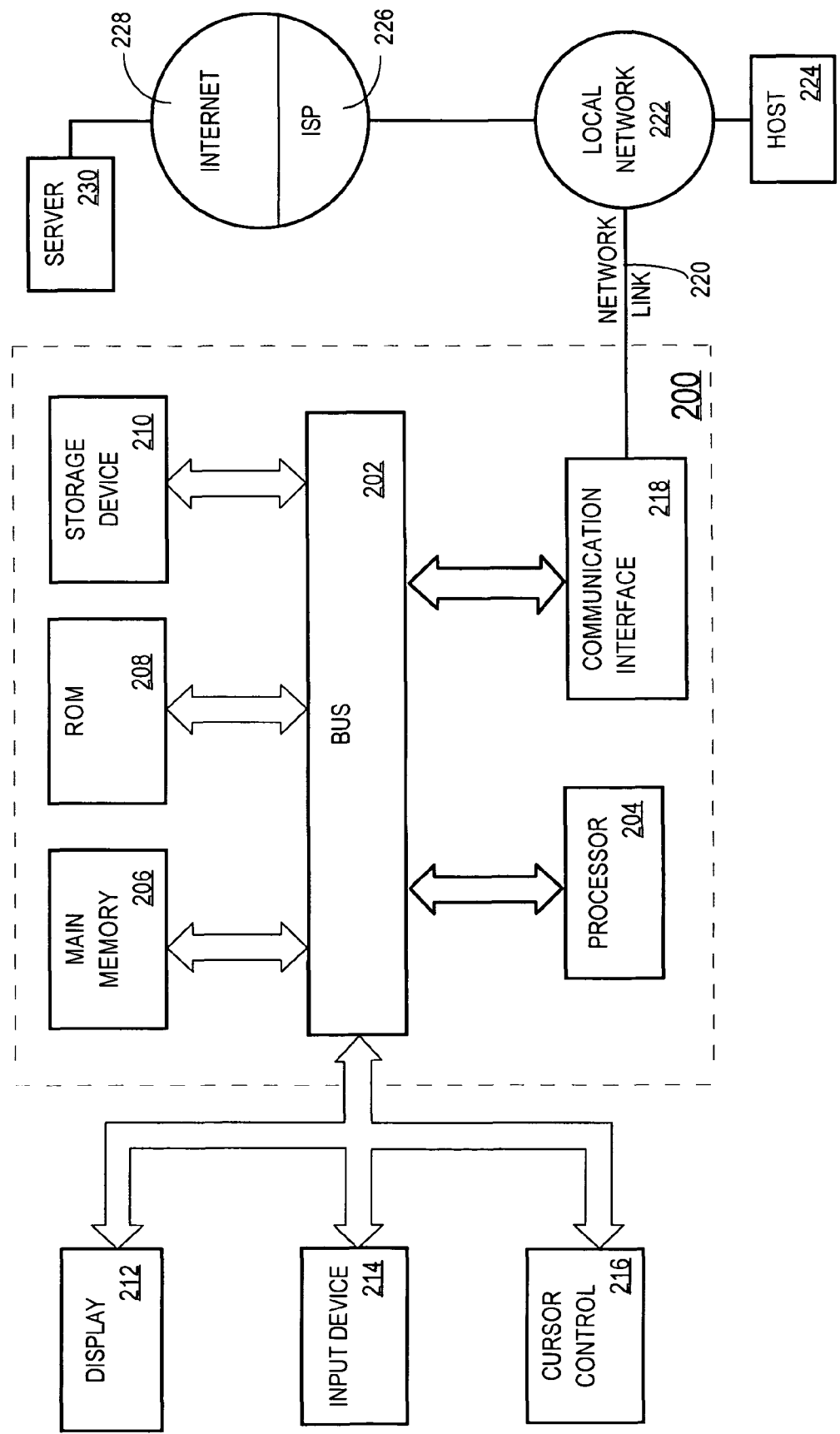
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Trans-mission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising computer-implemented steps of:
   determining that a particular node has failed, wherein the particular node is in a shared-nothing database system in which at least some database data, on which the particular node performed operations, is stored on a particular storage device; and
   in response to determining that the failure has occurred, performing parallel recovery, by two or more non-failed nodes that have physical access to the particular storage device, of at least some of the database data on which the particular node performed operations.

2. The method of claim 1, further comprising computer-implemented steps of:
   maintaining a plurality of persistent data items on the particular storage device;
   wherein the particular storage device is accessible to a plurality of nodes;
   wherein the persistent data items including a particular data item stored at a particular location on said particular storage device;
   assigning exclusive ownership of each of the persistent data items to one of the nodes;
   wherein a particular node of said plurality of nodes is assigned exclusive ownership of said particular data item;
   wherein when any node wants an operation to be performed that involves said particular data item, the node that desires the operation to be performed ships the operation to the particular node for the particular node to perform the operation on the particular data item as said particular data item is exclusively owned by said particular node;
   wherein performing parallel recovery comprises: (a) assigning, to each of two or more recovery nodes, exclusive ownership of a subset of a set of persistent data items that were involved in the failure, and (b) each recovery node of the two or more recovery nodes performing a recovery operation on the subset of persistent data items that were assigned to that recovery node.

3. The method of claim 1, wherein the failure is a media failure of the particular storage device.

4. The method of claim 1, wherein the failure is a failure of a node that has exclusive ownership of a set of persistent data items that are stored on the particular storage device, and wherein performing parallel recovery further comprises assigning, to each of two or more recovery nodes, exclusive ownership of a subset of the persistent data items that were exclusively owned by the failed node.

5. The method of claim 4, wherein:
   the two or more recovery nodes include a first recovery node and a second recovery node; and
   a least a portion of a recovery operation performed by the first recovery node on the subset of data exclusively assigned to the first recovery node is performed in parallel with at least a portion of a recovery operation performed by the second recovery node on the subset of data exclusively assigned to the second recovery node.

6. The method of claim 4, further comprising computer-implemented steps of:
   organizing, into a plurality of buckets, a plurality of persistent data items that are stored on the particular storage device; and
   establishing a mapping between the plurality of buckets and a plurality of nodes, wherein each node has exclusive ownership of the data items that belong to all buckets that map to that node; and
   determining which data items need to be recovered based on said mapping.

7. The method of claim 6, further comprising computer-implemented steps of:
   performing a first pass on said mapping to determine which buckets have data items that need to be recovered;
   performing a second pass on said mapping to perform recovery on the data items that need to be recovered; and
   after performing the first pass and before completing the second pass, making available for access the data items that belong to all buckets that do not have to be recovered.

8. The method of claim 4, wherein each recovery node of the two or more recovery nodes performs a recovery operation based on recovery logs, associated with the failed node, on the particular storage device.

9. The method of claim 8, further comprising the computer-implemented step of a recovery coordinator scanning recovery logs associated with the failed node and distributing recovery records to the two or more recovery nodes.

10. The method of claim 8, wherein each of the two or more recovery nodes scans recovery logs associated with the failed node.

11. The method of claim 1, wherein performing parallel recovery comprises:
    each of the two or more non-failed nodes applying undo records to blocks; and
    tracking which undo records have been applied.

12. The method of claim 1, further comprising the computer-implemented step of, prior to the failure, the failed node storing, within redo records that are generated by the failed node, bucket numbers that indicate buckets to which the data items associated with the redo records belong.

13. The method of claim 1, wherein performing parallel recovery comprises:
    a recovery coordinator determining that a first set of one or more tasks required for recovery of said failed node should be performed serially, and that a second set of one or more tasks required for recovery of said failed node should be performed in parallel; and
    performing the first set of one or more tasks serially; and
    using said two or more non-failed nodes to perform said second set of one or more tasks in parallel.

14. The method of claim 13, wherein the step of determining that a second set of one or more tasks required for recovery of said failed node should be performed in parallel is performed based, at least in part, on the size of one or more objects that need to be recovered.

15. The method of claim 13, wherein:
    ownership of data items involved in said second set of one or more tasks is passed from the recovery coordinator to the two or more non-failed nodes to allow said two or more non-failed nodes to perform said second set of one or more tasks; and
    after performance of said second set of one or more tasks and before completion of the recovery of said failed node, ownership of data items involved in said second set of one or more tasks is passed back to said recovery coordinator from said two or more non-failed nodes.

16. A non-volatile or volatile computer-readable non-transitory medium carrying one or more sequences of instructions which, when executed by one or more processors, causes the one or more processors to perform steps comprising:
    determining that a particular node has failed, wherein the particular node is in a shared-nothing database system in which at least some database data, on which the particular node performed operations, is stored on a particular storage device; and in response to determining that the failure has occurred, performing parallel recovery, by two or more non-failed nodes that have physical access to the particular storage device, of at least some of the database data on which the particular node performed operations.

17. The non-volatile or volatile computer-readable storage medium of claim 16, wherein the steps further comprise:

maintaining a plurality of persistent data items on the particular storage device;

wherein the particular storage device is accessible to a plurality of nodes;

wherein the persistent data items including a particular data item stored at a particular location on said particular storage device;

assigning exclusive ownership of each of the persistent data items to one of the nodes;

wherein a particular node of said plurality of nodes is assigned exclusive ownership of said particular data item;

wherein when any node wants an operation to be performed that involves said particular data item, the node that desires the operation to be performed ships the operation to the particular node for the particular node to perform the operation on the particular data item as said particular data item is exclusively owned by said particular node;

wherein performing parallel recovery comprises: (a) assigning, to each of two or more recovery nodes, exclusive ownership of a subset of a set of persistent data items that were involved in the failure, and (b) each recovery node of the two or more recovery nodes performing a recovery operation on the subset of persistent data items that were assigned to that recovery node.

18. The non-volatile or volatile computer-readable storage medium of claim 16, wherein the failure is a media failure of the particular storage device.

19. The non-volatile or volatile computer-readable storage medium of claim 16, wherein the failure is a failure of a node that has exclusive ownership of a set of persistent data items that are stored on the particular storage device, and wherein performing parallel recovery further comprises assigning, to each of two or more recovery nodes, exclusive ownership of a subset of the persistent data items that were exclusively owned by the failed node.

20. The non-volatile or volatile computer-readable storage medium of claim 19, wherein:

the two or more recovery nodes include a first recovery node and a second recovery node; and a least a portion of a recovery operation performed by the first recovery node on the subset of data exclusively assigned to the first recovery node is performed in parallel with at least a portion of a recovery operation performed by the second recovery node on the subset of data exclusively assigned to the second recovery node.

21. The non-volatile or volatile computer-readable storage medium of claim 19, wherein the steps further comprise:

organizing, into a plurality of buckets, a plurality of persistent data items that are stored on the particular storage device; and establishing a mapping between the plurality of buckets and a plurality of nodes, wherein each node has exclusive ownership of the data items that belong to all buckets that map to that node; and determining which data items need to be recovered based on said mapping.

22. The non-volatile or volatile computer-readable storage medium of claim 21, wherein the steps further comprise:

performing a first pass on said mapping to determine which buckets have data items that need to be recovered;

performing a second pass on said mapping to perform recovery on the data items that need to be recovered; and after performing the first pass and before completing the second pass, making available for access the data items that belong to all buckets that do not have to be recovered.

23. The non-volatile or volatile computer-readable storage medium of claim 19, wherein each recovery node of the two or more recovery nodes performs a recovery operation based on recovery logs, associated with the failed node, on the particular storage device.

24. The non-volatile or volatile computer-readable storage medium of claim 23, wherein the steps further comprise the step of a recovery coordinator scanning recovery logs associated with the failed node and distributing recovery records to the two or more recovery nodes.

25. The non-volatile or volatile computer-readable storage medium of claim 23, wherein each of the two or more recovery nodes scans recovery logs associated with the failed node.

26. The non-volatile or volatile computer-readable storage medium of claim 16, wherein performing parallel recovery comprises:

each of the two or more non-failed nodes applying undo records to blocks; and tracking which undo records have been applied.

27. The non-volatile or volatile computer-readable storage medium of claim 16, wherein the steps further comprise the step of, prior to the failure, the failed node storing, within redo records that are generated by the failed node, bucket numbers that indicate buckets to which the data items associated with the redo records belong.

28. The non-volatile or volatile computer-readable non-transitory storage medium of claim 16, wherein performing parallel recovery comprises:

a recovery coordinator determining that a first set of one or more tasks required for recovery of said failed node should be performed serially, and that a second set of one or more tasks required for recovery of said failed node should be performed in parallel; and performing the first set of one or more tasks serially; and using said two or more non-failed nodes to perform said second set of one or more tasks in parallel.

29. The non-volatile or volatile computer-readable non-transitory storage medium of claim 28, wherein the step of determining that a second set of one or more tasks required for recovery of said failed node should be performed in parallel is performed based, at least in part, on the size of one or more objects that need to be recovered.

30. The non-volatile or volatile computer-readable non-transitory storage medium of claim 28, wherein:

ownership of data items involved in said second set of one or more tasks is passed from the recovery coordinator to the two or more non-failed nodes to allow said two or more non-failed nodes to perform said second set of one or more tasks; and after performance of said second set of one or more tasks and before completion of the recovery of said failed node, ownership of data items involved in said second set of one or more tasks is passed back to said recovery coordinator from said two or more non-failed nodes.

* * * * *

UNITED STATES PATENT AND TRADEMARK OFFICE
CERTIFICATE OF CORRECTION

| | | |
|---|---|---|
| PATENT NO. | : 8,234,517 B2 | Page 1 of 2 |
| APPLICATION NO. | : 10/831413 | |
| DATED | : July 31, 2012 | |
| INVENTOR(S) | : Bamford et al. | |

It is certified that error appears in the above-identified patent and that said Letters Patent is hereby corrected as shown below:

Title page 2, in column 2, under "Other Publications", line 22, delete "Intrnational" and insert -- International --, therefor.

In column 11, line 53, delete "Trans-mission" and insert -- Transmission --, therefor.

In column 13, line 53, in Claim 5, delete "a least" and insert -- at least --, therefor.

In column 14, line 63, in Claim 16, delete "carrying" and insert -- storing --, therefor.

In column 15, line 9, in Claim 17, delete "storage" and insert -- non-transitory --, therefor.

In column 15, line 35, in Claim 18, delete "storage" and insert -- non-transitory --, therefor.

In column 15, line 38, in Claim 19, delete "storage" and insert -- non-transitory --, therefor.

In column 15, line 46, in Claim 20, delete "storage" and insert -- non-transitory --, therefor.

In column 15, line 49, in Claim 20, delete "a least" and insert -- at least --, therefor.

In column 15, line 55, in Claim 21, delete "storage" and insert -- non-transitory --, therefor.

In column 16, line 1, in Claim 22, delete "storage" and insert -- non-transitory --, therefor.

In column 16, line 11, in Claim 23, delete "storage" and insert -- non-transitory --, therefor.

In column 16, line 15, in Claim 24, delete "storage" and insert -- non-transitory --, therefor.

In column 16, line 20, in Claim 25, delete "storage" and insert -- non-transitory --, therefor.

Signed and Sealed this
Twenty-third Day of October, 2012

David J. Kappos
*Director of the United States Patent and Trademark Office*

CERTIFICATE OF CORRECTION (continued)
U.S. Pat. No. 8,234,517 B2

In column 16, line 23, in Claim 26, delete "storage" and insert -- non-transitory --, therefor.

In column 16, line 29, in Claim 27, delete "storage" and insert -- non-transitory --, therefor.

In column 16, line 35, in Claim 28, before "medium" delete "storage".

In column 16, line 46, in Claim 29, before "medium" delete "storage".

In column 16, line 52, in Claim 30, before "medium" delete "storage".